US007020720B1

(12) United States Patent
Donahue et al.

(10) Patent No.: US 7,020,720 B1
(45) Date of Patent: Mar. 28, 2006

(54) APPARATUS AND METHOD FOR PROVIDING A GLOBALLY ROUTABLE BYPASS IP ADDRESS TO A HOST COMPUTER ON A PRIVATE NETWORK

(75) Inventors: David B. Donahue, Mountain View, CA (US); Benn Bollay, San Francisco, CA (US); Patrick Ross, Sunnyvale, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 773 days.

(21) Appl. No.: 09/996,277

(22) Filed: Nov. 27, 2001

Related U.S. Application Data

(60) Provisional application No. 60/255,346, filed on Dec. 8, 2000.

(51) Int. Cl.
*G06F 15/16* (2006.01)
(52) U.S. Cl. ...................................................... 709/245
(58) Field of Classification Search ................ 709/220, 709/238, 245, 249
See application file for complete search history.

(56) References Cited

U.S. PATENT DOCUMENTS 5,991,810 A * 11/1999 Shapiro et al. ............. 709/229
6,618,757 B1 * 9/2003 Babbitt et al. .............. 709/226
6,697,864 B1 * 2/2004 Demirtjis et al. ........... 709/229

* cited by examiner

*Primary Examiner*—David Y. Eng
(74) *Attorney, Agent, or Firm*—Georgann S. Grunebach

(57) ABSTRACT

A first publically routable IP address and a second publically routable IP address (bypass IP address) is firstly received from an Internet Service Provider (ISP) that forms part of a public network. An instruction to assign the second publically routable IP address to the host computer is then received. The first publically routable IP address is assigned to a Network Address Translation (NAT) service on the gateway and the second publically routable IP address is allocated to the host computer. Finally, the second publically routable IP address is allocated to the host computer. This allows the host computer to be configured to enable it to receive unsolicited packets from the public network through the gateway. A gateway and computer program product are also provided.

17 Claims, 5 Drawing Sheets

| GLOBAL PUBLIC I.P. ADDRESS | PRIVATE I.P. ADDRESS | DESTINATION TCP PORT | SOURCE TCP PORT | ASSIGNED NEW TCP SOURCE PORT |
|---|---|---|---|---|
| 207.05.07.05 | 20.20.20.1 | 80 | 50202 | 22345 |
| | 20.20.20.2 | 80 | 50203 | 23456 |
| | 20.20.20.3 | 80 | 50623 | 24567 |
| | 20.20.20.4 | 80 | 50202 | 25678 |

FIG. 2
(PRIOR ART)

APPARATUS AND METHOD FOR PROVIDING A GLOBALLY ROUTABLE BYPASS IP ADDRESS TO A HOST COMPUTER ON A PRIVATE NETWORK

This invention claims priority to provisional patent application Ser. No. 60/255,346 filed on Dec. 8, 2000.

BACKGROUND OF THE INVENTION

1. Field of the Invention

The present invention relates generally to computer networking, and more particularly to an apparatus and method for providing a globally routable bypass IP address to a host computer located on a private network. The system makes use of a router integrated Network Address Translation (NAT) service.

2. Description of Related Art

While high-speed Internet connections to large businesses have been in existence for quite some time, high speed Internet connections to homes and small businesses have only recently become more commonplace. Technologies such as Dial-up analog modems, ISDN (Integrated Services Digital Network), Cable modems, Satellite, and DSL (Digital Subscriber Line), are all competing for market share. The two technologies at the forefront, DSL and Cable (collectively known as broadband), offer much faster Internet access than dial-up modems, for a cost substantially lower than ISDN.

Cable modems, enable one to hook up a PC to a local cable television line and receive data at about 1.5 Mbps. This data rate far exceeds that of both 56 Kbps analog modems, and the 128 Kbps of ISDN. The actual bandwidth for Internet service over a cable TV line is up to 27 Mbps for receiving data, and up to about 2.5 Mbps of bandwidth for transmitting data. However, since the local provider may not be connected to the Internet on a line faster than a T-1 at 1.5 Mpbs, a more likely data rate will be closer to 1.5 Mpbs. Cable, however, suffers the drawback that it is carried on existing cable television lines, which not all homes, and especially not all small businesses are equipped with. Furthermore, available bandwidth is shared with other cable users in the same geographic area.

DSL, on the other hand, is 20 times faster than satellite connections, 60 times faster than ISDN, and 250 times faster than 33.6 Kbps analog modems. xDSL (hereafter "DSL") refers to different variations of DSL, such as ADSL (Asymmetric Digital Subscriber Line), HDSL (High bit-rate Digital Subscriber Line), and RADSL (Rate Adaptive Digital Subscriber Line). Assuming that the location of one's home or business is close enough to a telephone company central office that offers DSL service, one can receive data at rates up to 6.1 megabits (millions of bits) per second. More typically, individual connections will provide from 1.544 Mbps to 512 Kbps downstream and about 128 Kbps upstream. Best of all, those bits are transmitted via the same copper wire one uses for telephone calls, but without the complex setup of ISDN. DSL does this by taking advantage of unused frequencies that exist on standard telephone lines. An added advantage is that the original POTS (plain-old telephone service) frequencies remain free to handle voice traffic over the same copper wires. Yet another advantage is that one does not share the line with others in the same geographical area. Within a few years, DSL is expected to replace ISDN in many areas and to compete with the cable modem in bringing multimedia to homes and small businesses around the world.

As consumers becomes more technically advanced, they place ever increasing technical demands on their broadband Internet connections. For example, consumers may want to connect multiple computers on a Local Area Network (LAN) to the Internet, or may require running a Web server through their broadband connection.

FIG. 1 is a block diagram of an existing system 100 for connecting multiple computers (hereafter "hosts") 102 through a broadband modem 104 and an Internet Service Provider (ISP) 106, to the Internet 108. This system 100 uses a Network Address Translation (NAT) service, which is typically found on a NAT device 110, such as those provided by LINKSYS. NAT is used to translate Internet Protocol addresses (hereafter "IP addresses") between distinct networks. Typically, NAT translates IP addresses between a private network 118, such as a home LAN, and a public network 120, such as the Internet. For example, a NAT service maps private IP addresses to one or more public IP addresses outgoing packets being transmitted from the private network to the public network, and unmaps the public IP addresses on incoming packets being transmitted from the public network to the private network, back into private IP addresses. Generally, public IP addresses are globally routable IP addresses associated with the Internet, such as 216.115.108.33.

NAT, therefore, allows multiple computing devices on a LAN to connect to the Internet, while sharing only a few public IP addresses. This conserves the number of global public IP addresses, which are typically bought or leased by the consumer or his ISP.

NAT also helps ensure security since each outgoing or incoming request must go through a translation process that offers the opportunity to qualify or authenticate the request or match it to a previous request. Furthermore, NAT can be statically defined or it can be set up to dynamically translate from, and to, a pool of IP addresses. A description of NAT, in general terms, can be found in RFC 1631, which is incorporated herein by reference.

An example of a NAT table 200 is shown in FIG. 2. Various private IP addresses 204, such as 20.20.20.1–20.20.20.4, are assigned to hosts connected to the private network. One or more public IP addresses 202 are provided, such as 207.05.07.05. Requests sent from any host out to the Internet are assigned a high source Transmission Control Protocol (TCP) port number, i.e. from 1024 to 65536, where a TCP port is the way a client program specifies a particular server program on a computer in a network. Typically, the request contains a header including its Private IP address 204; the address of the Web server 116 (FIG. 1) where it is being sent, such as <WWW.YAHOO.COM> (or it's associated IP address); the destination TCP port 206 that the Web server is listening on, typically 80; and the source TCP port number 208, typically a random number from 1024 to 65536.

If only one host is connected to the Internet, there is generally no problem. The NAT service simply edits the header to indicate that the request is coming from the public IP address 202, and sends the request out to the Internet. Problems may, however, occur when more than one host is connected to the private network. Although unlikely, two hosts might use the identical source TCP port number 208, such as 50202. This makes receiving a response to the request impossible, as the NAT service cannot ascertain which of the two hosts to send the response to, as they both have the same source TCP port number 208. To alleviate this problem, the NAT service assigns random, yet distinct, new TCP source port numbers 210 to each host, which it places in the request header. Therefore, a response returning from a Web server 116 (FIG. 1) is accurately sent to the host, having the newly assigned port number, that requested the response.

When the NAT device translates incoming data packets from the public network, it translates the public IP address 202 to the private IP address 204 associated with the TCP port of the host that requested the packet. Some network protocols embed the IP address in the data section of the packet where a NAT product cannot easily translate it. This breaks several common network protocols and requires the user to implement technically complex, application specific, workarounds.

The above described system works fine for outbound routing of data packets and for return packets responding to an outbound request. The system does not however work for inbound data packets directed at, for example, a Web server on a private network. A number of complex software and hardware solutions exist to solve this problem. However, no consumer configurable, or self configurable, system exists for setting up a Web server on a private network. applications such as streaming media.

Moreover, by having a NAT device connected between a host, acting as a Web server, and the modem, necessitates assigning a public IP address to the NAT device. This wastes precious public IP addresses.

Therefore, a need exists for a easily configurable system for setting up a Web server on a private network.

BRIEF SUMMARY OF THE INVENTION

According to the invention there is provided a method for providing a publically routable Internet Protocol (IP) address to a host computer located on a private network. A first publically routable IP address and a second publically routable IP address (bypass IP address) is firstly received from an Internet Service Provider (ISP) that forms part of a public network. A first privately routable IP address is then allotted to a gateway coupled to both the public network and a private network. A second privately routable IP address is assigned to a host computer in a private network. Subsequently, the second privately routable IP address is transmitted to the host computer. This enables the host computer to be configured to communicate with the gateway on the private network. An instruction to assign the second publically routable IP address to the host computer is then received. The first publically routable IP address is assigned to a Network Address Translation (NAT) service on the gateway and the second publically routable IP address is allocated to the host computer. Finally, the second publically routable IP address is allocated to the host computer. This allows the host computer to be configured to enable it to receive unsolicited packets from the public network through the gateway.

Further according to the invention there is provided a gateway for providing a publically routable Internet Protocol (IP) address to a host computer located on a private network. The gateway includes a Central Processing Unit (CPU), communications circuitry, and a memory. The memory includes an operating system, communication procedures for communicating with the public and private networks, privately and a publically routable IP blocks, a Network Address Translation (NAT) service, a Web Client and server, at least one Web page, a Dynamic Host Configuration Protocol (DHCP) server, and a control program. The control program contains instructions for performing the above described method.

Still further according to the invention there is provided a computer program product for providing a publically routable Internet Protocol (IP) address to a host computer located on a private network. The computer program product comprises a computer readable storage and a computer program stored therein. The computer program comprises instructions for performing the above described method.

Furthermore, due to scaling problems relating to incremental cost per DSL subscriber, the invention does not introduce any new company provided hardware (such as a Separate NAT device) or even new Ethernet interface jacks on the modem.

The embedding of the NAT functionality in the xDSL modem/router combined with the creation of a modem internal virtual (or logical) LAN (VLAN) allows the entire integrated NAT solution to be implemented in modem software alone. (The customer may provide a Ethernet hub if he wanted multiple hosts).

By integrating this NAT functionality directly in the xDSL modem/router, the router's own protected/internal IP address (a fully externally routable IP address) can be made available (as a Bypass IP) for issuing to a host directly, without any address translation whatsoever, thus avoiding all protocol problems with data section embedded IPs.

This VLAN can contain the fully externally routable Bypass IP address, the externally routable NAT IP address and a privately routable "protected/inside" IP block (for hosts behind the NAT) all of which are accessible by a single Ethernet interface and via the xDSL inbound line with 100% IP address efficiency, a complete lack of user interface, no application specific workarounds (for the host on the Bypass IP) and no additional (to us) hardware cost.

BRIEF DESCRIPTION OF THE DRAWINGS

Additional objects and features of the invention will be more readily apparent from the following detailed description and appended claims when taken in conjunction with the drawings, in which:

FIG. 2 is an example of a prior art NAT table used in connection with the system shown in FIG. 1;

DETAILED DESCRIPTION OF THE INVENTION

For ease of explanation the following description and drawings represent a DSL system. It should, however, be clear to those skilled in the art that the present invention may be embodied in any a Bi-directional IP communication system without departing from the spirit and scope of the present invention as defined in the accompanying claims. Such a Bi-directional IP communication system includes the use of a Bi-directional IP communication device, such as a DSL gateway, cable modem, or the like.

Figure 3:
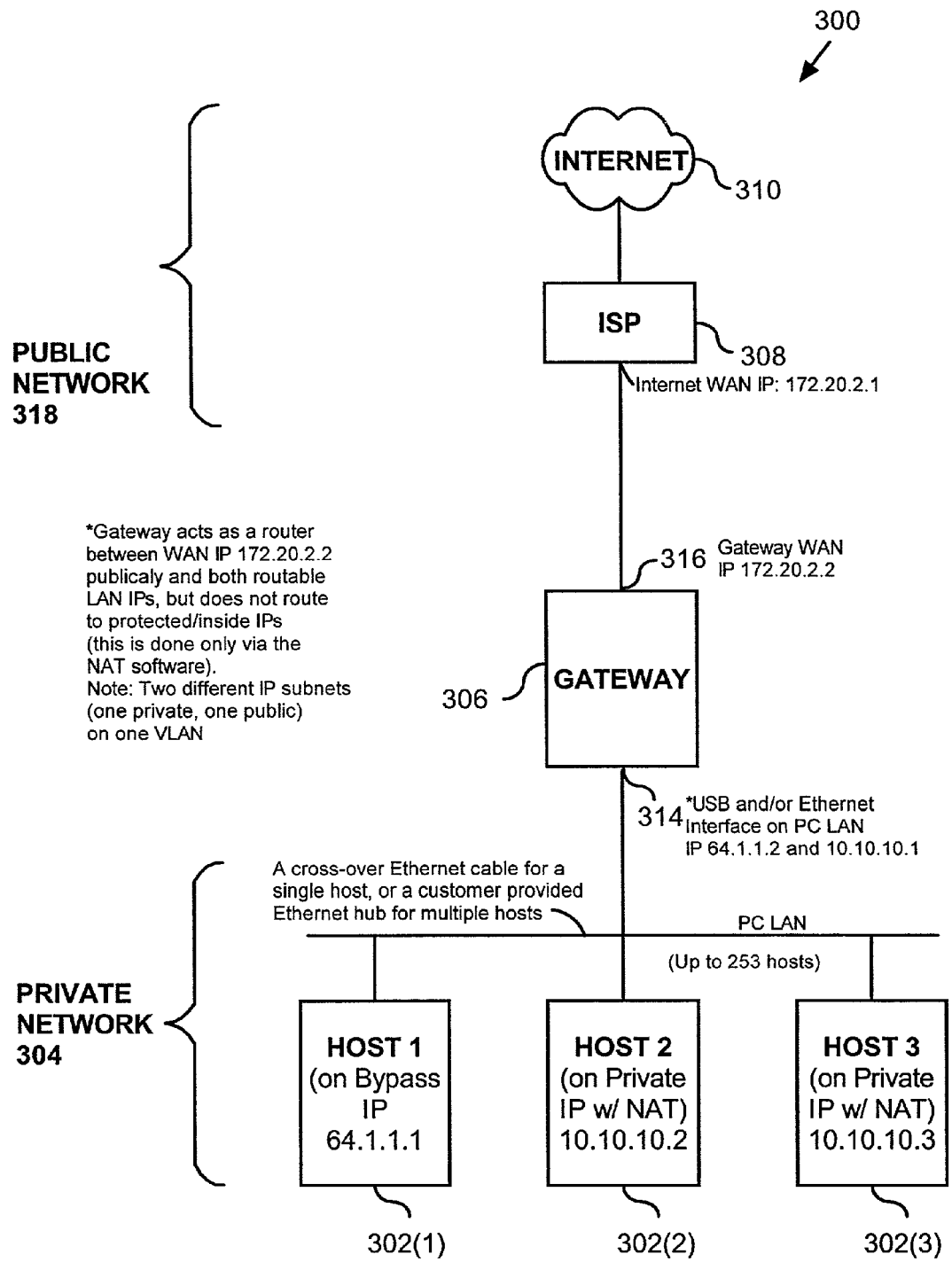
FIG. 3 is a block diagram of a system architecture, according to an embodiment of the invention.

FIG. 3 is a block diagram of a system architecture 300, according to an embodiment of the invention. The system 300 includes multiple host computing devices (hereafter "hosts") 302(1)–(N) coupled to a private network 304, preferably a Local Area Network (LAN). Hosts 302(1)–(N) are preferably personal computers, but may be any computing devices, such as wireless devices, IP telephones, or the like. The LAN is coupled to a gateway 306, preferably a DSL gateway, which in turn connects to an ISP 308 which is coupled to the Internet 310. The gateway 306 includes an internal NAT service 422 (FIG. 4) running dynamic NAT. ISP 308 preferably comprises an IP/ATM router with an Asynchronous Transfer Mode (ATM) Network, a Digital Subscriber Line Access Multiplexer (DSLAM), and an xDSL gateway (Effectively a xDSL to IP router). An ATM network is a dedicated-connection switching technology that organizes digital data into 53-byte cells or packets and transmits them over a medium using digital signal technology. Individually, a packet is processed asynchronously relative to other related packets and is queued before being multiplexed over the line. A DSLAM is a network device, usually at a telephone company central office, that receives signals from multiple customer Digital Subscriber Line (DSL) connections and puts the signals on a high-speed backbone line using multiplexing techniques. Depending on the product, DSLAM multiplexers connect DSL lines with some combination of ATM, frame relay, or IP networks. DSLAM enables a DSL provider company to offer business or homes users the fastest phone line technology (DSL) with the fastest backbone network technology (ATM). Connection between the gateway and the ISP is preferably over a Plain Old Telephone (POTS) line (often the customers existing analog phone line).

When NAT is configured on the NAT service 422 (FIG. 4), the hosts 302(1)–(N) and the LAN interface 314 of the gateway 306 are configured with IP addresses from a privately routable IP block (shown as 10.10.10.n). When a packet is sent from any of the hosts 302(1)–(N), they first search their own internal routing tables (not shown) to ascertain if the destination IP address of the packet is on their own local subnet. If it is, for example 10.10.10.3, then the packet is forwarded to the host having the destination IP address. If the destination address is not on their own local subnet, the packet is forwarded to the Default Gateway, in this configuration the LAN interface 314 of the gateway 306, which has a private IP address associated with it (shown as 10.10.10.1). Therefore, the hosts 302(1)–(N) route all public networking traffic to the private IP address (shown as 10.10.10.1) of the PC LAN interface. The gateway 306 then uses the externally routable public IP address (shown as 64.1.1.2) of the NAT software to send the packet to the Wide Area Network (WAN) interface 316 of the gateway 306 and out to the Internet 310. This is normally the only way to get traffic from the hosts 302(1)–(N) on the LAN 304 to the Internet 310.

Due to the hosts 302(1)–(N) having private IP addresses, inbound connections to the hosts 302(1)–(N) are not possible without implementing complex, port forwarding schemes, which are difficult for consumers to configure without expert help.

Figure 1:
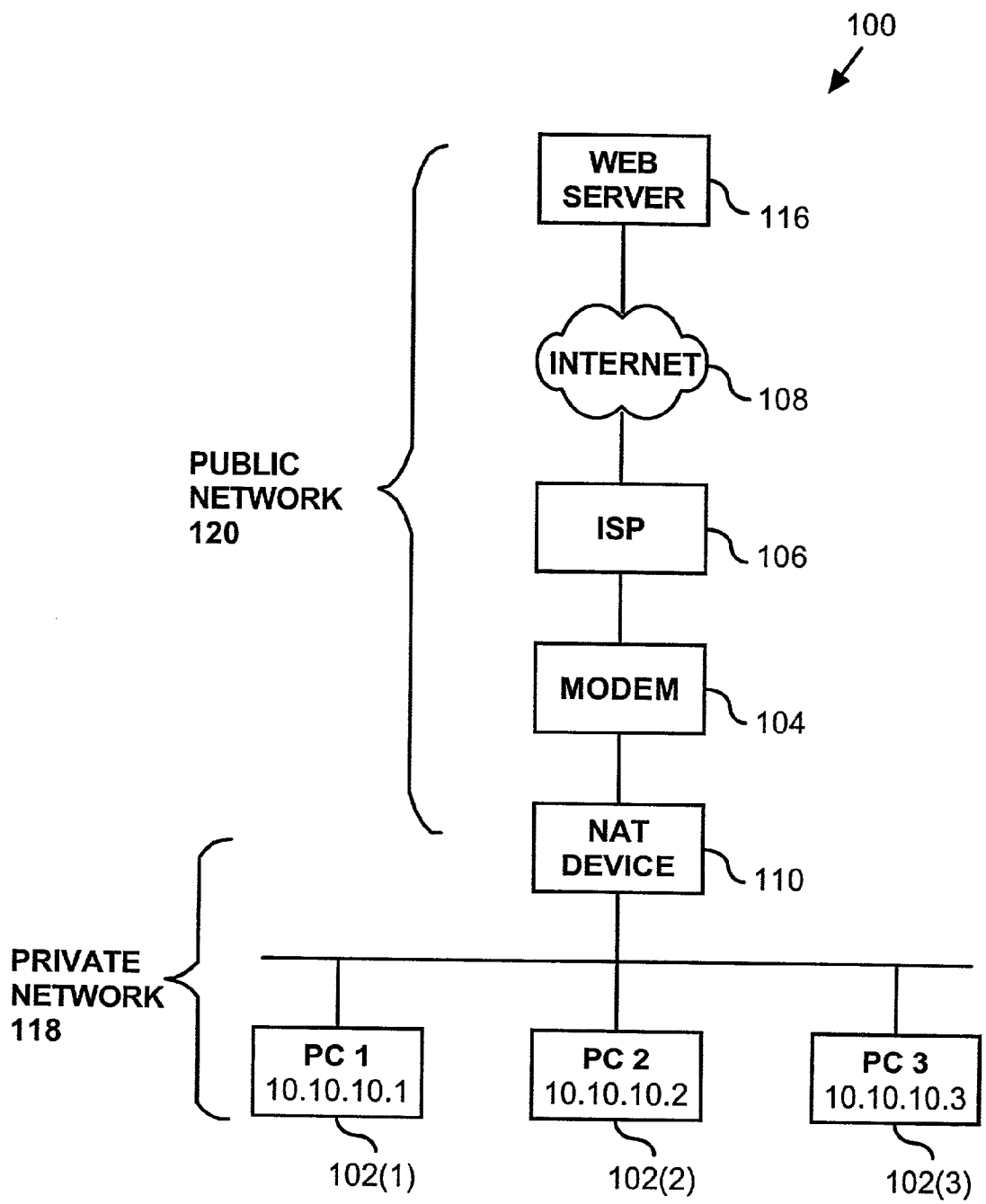
FIG. 1 is a block diagram of a prior art system for connecting multiple computers to the Internet.

Because the NAT service 422 (FIG. 4) is incorporated into the gateway 306, only a single globally routable public IP address is needed, i.e., for the gateway/NAT. This is in contrast to prior art systems which assign separate public IP address to the modem 104 (FIG. 1) and the NAT device 110 (FIG. 1). Typically, the smallest amount of public IP addresses issued to a consumer is a single 30 bit subnet which has two useable publically routeable IP addresses. Therefore, by incorporating the NAT device into the gateway, the system of the present invention is left with an extra public IP address or a Bypass IP address. This extra public IP address (Bypass IP address) can then be assigned to one of the hosts, which essentially places that host on the public network. This host can, therefore, accept incoming packets and act as a Web server or other service that requires direct connection to the Internet, such as a mail server, telnet, DNS, IP phone, or the like.

Therefore, when using a Bypass IP address, an additional, externally routable, public IP address (shown as 64.1.1.1) is configured for one specific host 302(1) on the PC LAN 304. This host 302(1) can then bypass the NAT functionality and use the NAT IP (shown as 64.1.1.2) as it's Default gateway. Host 302(1), therefore, has full bi-directional connectivity to the Internet. Additionally, external hosts on the Internet can make inbound connections directly to this bypass host 302(1), due to it's routable public IP address. This resolves protocol compatibility and inbound connection problems with existing prior art NAT systems. Other hosts on the network continue to use NAT as usual, since the bypass IP functionality runs concurrently with the NAT feature.

Figure 4:
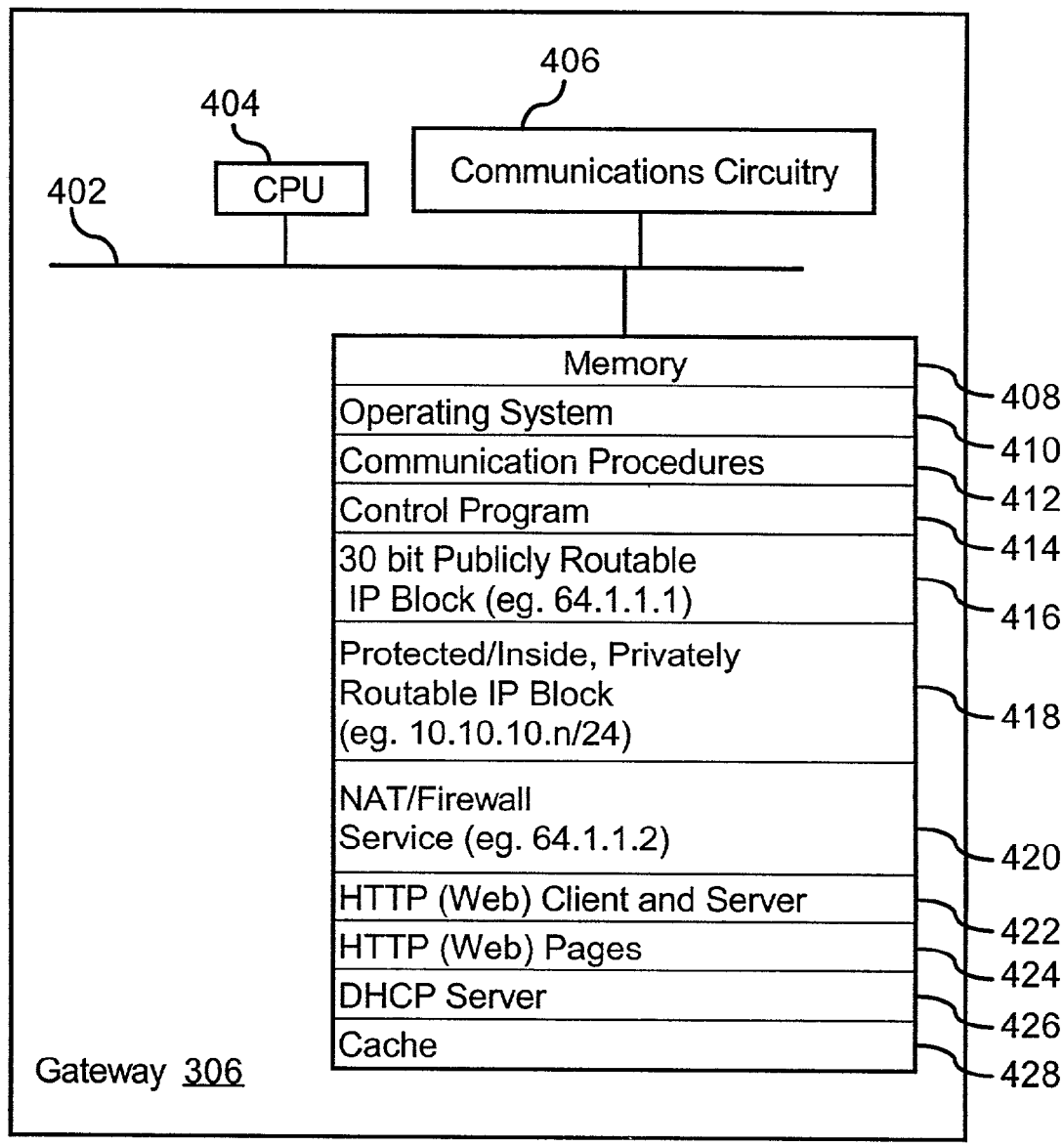
FIG. 4 is a block diagram of the modem shown in FIG. 3.

FIG. 4 is a block diagram of the gateway 306 shown in FIG. 3. Modem 306 preferably includes at least one data processor or central processing unit (CPU) 404; a memory 408; communications circuitry 406; and at least one bus 402 that interconnects these components. Memory 408 preferably stores an operating system 410 (such as VXWORKS™, or IMBEDDED LINUX™), having instructions for communicating, processing, accessing, storing, or searching data, etc. Memory 408 also preferably includes communication procedures 412; a control program 414; a 30 bit Publicly Routable IP Block 416 (eg. 64.1.1.1 and 64.1.1.2); a protected/inside privately routable IP block 418 (shown as 10.10.10.n); a NAT/Firewall service 420; a HTTP (Web) Client and Server 422; HTTP (Web) Pages 424; a Dynamic Host Configuration Protocol (DHCP) server 426; and a cache 428.

Communication procedures 412 are used for communicating with both the public 318 and private 304 networks. The control program 414 assigns one of the Publicly Routable IP addresses 416 to one of the hosts 302(1)–(N) (FIG. 1). The NAT/Firewall service 420 maps traffic between one of the Publicly Routable IP addresses 416 (public network 318) and the privately routable IP addresses 418 (private network 304). The HTTP (Web) Client and Server 422 serves and receives HTTP (Web) Pages 424. The DHCP server 426 automatically assigns the privately routable IP addresses 418 (shown as 10.10.10.n) to the hosts eliminating having to manually assign permanent IP addresses to each host. The cache 428 is used to temporarily store data.

Figure 5:
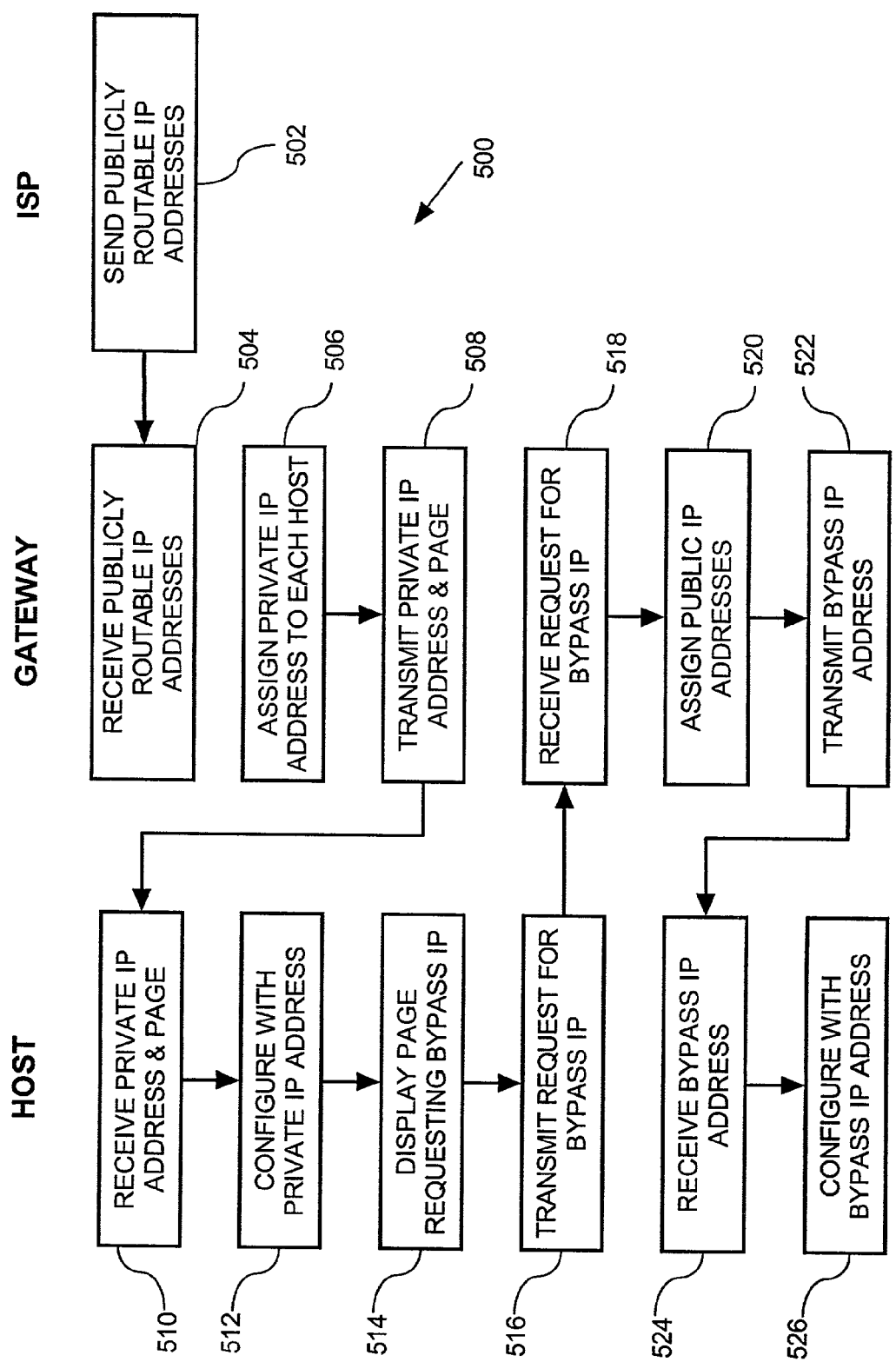
FIG. 5 is a flow chart of a method for assigning a host a routable public IP address, according to an embodiment of the invention.

FIG. 5 is a flow chart 500 of a method for assigning a host a routable public IP address, according to an embodiment of the invention. The gateway is first configured, preferably in a manner similar to that described in U.S. patent application Ser. No. 09/668,623, entitled "System and Method for Auto-Configuration of a DSL Modem" and filed on Sep. 22, 2000, which is hereby incorporated by reference. During this configuration, the ISP 308 (FIG. 3) sends 502 a publically routable IP block to the gateway 306 (FIG. 3). This publically routable IP block includes at least two publically routable IP addresses, such as 64.1.1.1 and 64.1.1.2. This publically routable IP block is received 504 by the gateway and stored in the memory 408 (FIG. 4) as the 30 bit publically routable IP block 416 (FIG. 4).

At any time thereafter, the DHCP server 426 on the gateway assigns 506 and transmits 508 privately routable IP addresses 418 (FIG. 4) to each host 302(1)–(N) (FIG. 3) connected to the gateway. After receiving 510 and storing its assigned privately routable IP address, each host configures 512 itself with its privately routable IP address so that it can communicate over the TCP/IP network with the gateway.

At any time thereafter, or at the same time that the privately routable IP addresses were sent to the hosts, or when a specific host makes a request for a publically routable IP address, the gateway transmits 508 an HTTP (Web) page 424 (FIG. 4) to the gateway using the HTTP (Web) client and server 422 (FIG. 4). This page queries whether the user of the host would like to assign a publically routable IP address to a specific host. This page is received 510 and displayed 514 by the host.

If the user wants to assign a publically routable IP address to a specific host, he/she transmits 516 a request for a publically routable IP address (bypass IP address) to the gateway. In a preferred embodiment, the host from which the request was transmitted 516 will receive the bypass IP address. Alternatively, the user can indicate which host he/she would like the bypass IP address to be assigned to, preferably by indicating the privately routable IP address of the desired host.

The request for assigning the bypass IP address is received 518 by the gateway, which thereafter assigns 520, using the control program 414 (FIG. 4), one publically routable IP address to the gateway and one publically routable IP address to the desired host. It should be appreciated that because the NAT service 420 (FIG. 4) is built into the gateway, the gateway only requires one publically routable IP address to communicate with the public network 318 (FIG. 3). The first being assigned to the NAT service and the second to the desired host.

The bypass IP address is then transmitted 522 to the desired host, which receives 524 it. The host then configures 526 itself with the bypass IP, and typically reboots.

In this way, the minimum amount of NAT publically routable IP addresses, i.e., two, is more efficiently used. The host with the bypass IP address is now effectively part of the public network 318 (FIG. 3) and can receive packets directed at it without first having to make a request for such packets. In other words, the host with the bypass IP address can now act as a Web-server, etc.

While the foregoing description and drawings represent preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method for providing a publically routable Internet Protocol (IP) address to a host computer located on a private network, comprising:
    assigning a first publically routable IP address to a gateway coupled to; both a public and a private network, said gateway comprising a NAST therein;
    allocating a second publically routable IP address to a host computer in said private network, where said host computer is coupled to said gateway; and
    transmitting said second publically routable IP address to said host computer, such that said host computer can be configured with said second publically routable IP address to enable it to receive unsolicited packets from said public network through said gateway by bypassing the NAT.

2. The method of claim 1, further comprising, prior to said assigning, receiving said first publically routable IP address and said second publically routable IP address from an Internet Service Provider (ISP) that forms part of said public network.

3. The method of claim 1, further comprising, prior to said assigning,
    allotting a first privately routable IP address to said gateway;
    assigning a second privately routable IP address to said host computer; and
    transmitting said second privately routable IP address to said host computer, such that said host computer can communicate with said gateway on said private network.

4. The method of claim 1, further comprising, prior to said assigning, receiving an instruction to assign said second publically routable IP address to said host computer.

5. The method of claim 1, further comprising, prior to said assigning, inquiring whether said host computer would like a publically routable IP address.

6. The method of claim 5, wherein said inquiring comprises transmitting a Web page to said host computer, where said Web page queries a user of said host computer whether said user would like a publically routable IP address to be assigned to said host computer.

7. The method of claim 1, wherein said assigning further comprises assigning said first publically routable IP address to a Network Address Translation (NAT) service on said gateway.

8. A method for providing a publically routable Internet Protocol (IP) address to a host computer located on a private network, comprising:
    receiving a first publically routable IP address and a second publically routable IP address from an Internet Service Provider (ISP);
    allotting a first privately routable IP address to a gateway coupled to both a public network and a private network;
    assigning a second privately routable IP address to a host computer in a private network; and
    transmitting said second privately routable IP address to said host computer, such that said host computer can be configured to communicate with said gateway on said private network;
    receiving an instruction to assign said second publically routable IP address to said host computer;
    assigning said first publically routable IP address to a Network Address Translation (NAT) service on said gateway;
    allocating said second publically routable IP address to said host computer; and
    transmitting said second publically routable IP address to said host computer, such that said host computer can be configured to enable it to receive unsolicited packets from said public network through said gateway by bypassing the NAT.

9. A gateway for providing a publically routable Internet Protocol (IP) address to a host computer located on a private network, comprising:
 a Central Processing Unit (CPU);
 communications circuitry; and
 a memory, comprising:
  a Network Address Translation (NAT) service:
  an operating system;
  communication procedures for communicating with a public and a private network;
  a control program containing:
   instructions for assigning a first publically routable IP address to a gateway coupled to both said public and said private networks;
   instructions for allocating a second publically routable IP address to a host computer in said private network; and
   instructions for transmitting said second publically routable IP address to said host computer, such that said host computer can be configured with said second publically routable IP address to enable it to
 receive unsolicited packets from said public network through said gateway bypassing the NAT service.

10. The gateway of claim 9, wherein said memory further comprises a publically routable IP block that contains said first and second publically routable IP addresses.

11. The gateway of claim 9, wherein said memory further comprises a privately routable IP block containing at least one privately routable IP address.

12. The gateway of claim 9, wherein said memory further comprises a Dynamic Host Configuration Protocol (DHCP) server.

13. The gateway of claim 9, wherein said memory further comprises a Web Client and server, and at least one Web page for querying said host computer whether said host computer would like a publically mutable IP address.

14. The gateway of claim 9, wherein said memory further comprises instructions for receiving said first publically routable IP address and said second publically routable IP address from an Internet Service Provider (ISP).

15. The gateway of claim 9, wherein said memory further comprises: instructions for allotting a first privately routable IP address to said gateway;
 instructions for assigning a second privately routable IP address to said host computer; and
 instructions for transmitting said second privately routable IP address to said host computer, such that said host computer can be configured to communicate with said gateway on said private network.

16. The gateway of claim 9, wherein said memory further comprises receiving an instruction to assign said second publically routable IP address to said host computer.

17. A computer, program product for providing a publically routable Internet Protocol (IP) address to a host computer located on a private network, the computer program product comprising a computer readable storage and a computer program stored therein, the computer program comprising:
 instructions for assigning a first publically routable IP address to a gateway coupled to both said public and said private networks;
 instructions for allocating a second publically routable IP address to a host computer in said private network; and
 instructions for transmitting said second publically routable IP address to said host computer, such that said host computer can be configured with said second publically routable IP address to enable it to receive unsolicited packets from said public network through said gateway by bypassing a Network Address Translation service within the gateway.

* * * * *